(12) United States Patent
Atkinson et al.

(10) Patent No.: US 8,683,792 B2
(45) Date of Patent: Apr. 1, 2014

(54) BURNT GAS EXHAUST PIPE EXTENDER

(75) Inventors: Aaron William Joseph Atkinson, Glendale, AZ (US); Kevin Craig Nevaux, Peoria, AZ (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 434 days.

(21) Appl. No.: 13/026,984

(22) Filed: Feb. 14, 2011

(65) Prior Publication Data
US 2012/0204538 A1    Aug. 16, 2012

(51) Int. Cl.
*F01N 1/00* (2006.01)
(52) U.S. Cl.
USPC .................................. 60/324; 60/312; 60/313
(58) Field of Classification Search
USPC ........... 60/312, 313, 322, 319; 180/89.2, 296, 180/309
See application file for complete search history.

(56) References Cited

U.S. PATENT DOCUMENTS

| | | | |
|---|---|---|---|
| 2,102,559 A | 8/1934 | Kadenacy | |
| 2,489,480 A * | 11/1949 | Chester | 285/148.23 |
| 2,489,481 A | 11/1949 | Chester | |
| 2,695,630 A | 11/1954 | Klein et al. | |
| 2,771,908 A | 11/1956 | Wilson | |
| 3,726,092 A | 4/1973 | Raczuk | |
| 4,226,298 A | 10/1980 | Bancel et al. | |
| 5,579,638 A * | 12/1996 | Archer | 60/312 |
| 6,769,511 B1 * | 8/2004 | Brooks et al. | 181/241 |
| 6,901,752 B2 * | 6/2005 | Uhler et al. | 60/312 |
| 7,650,867 B2 * | 1/2010 | Williams | 123/184.55 |
| 2009/0313981 A1 | 12/2009 | Maslar | |

FOREIGN PATENT DOCUMENTS

| | | | |
|---|---|---|---|
| DE | 4105057 | 8/1992 | |
| DE | 4105057 A1 * | 8/1992 | ............... F01N 7/00 |
| EP | 0851103 | 7/1998 | |
| FR | 2619414 | 2/1989 | |
| GB | 2284446 | 6/1995 | |
| JP | 2001248438 | 9/2001 | |
| KR | 2005050166 | 5/2005 | |
| KR | 2007064520 | 6/2007 | |
| WO | WO 95/30082 | 11/1995 | |

* cited by examiner

*Primary Examiner* — Thomas Denion
*Assistant Examiner* — Matthew T Largi
(74) *Attorney, Agent, or Firm* — Snell & Wilmer LLP

(57) ABSTRACT

An extendible exhaust system is disclosed for preventing exhaust gas seepage into the passenger compartment of a vehicle utilizing a pipe extender that slides along the tailpipe. The pipe extender has a retracted position and an extended position. The pipe extender moves from the retracted position to the extended position when the vehicle travels forward at a predetermined speed. When in the extended position, exhaust flows through the additional length of the pipe extender before exiting the exhaust system. Movement of the pipe extender from the retracted to the extended position may be by airflow traveling past the moving vehicle pushing on a flange acting as a sail against a tension spring. An electromagnet or motor drive system with a movement sensor may also be used to move the pipe extender from the retracted to the extended position.

20 Claims, 5 Drawing Sheets

BURNT GAS EXHAUST PIPE EXTENDER

BACKGROUND

1. Field of the Invention

The present invention relates generally to improvements in vehicle burnt gas exhaust systems and more particularly pertains to a new and improved exhaust pipe extension apparatus and method wherein the length of the exhaust system is extendable.

2. Description of the Related Art

In the field of exhaust pipe extension systems for motor vehicles, it has been the practice to extend or retract the exhaust pipe extension components based upon the sensing of engine revolutions per minute ("RPM"). In two-stroke engines, the passage length of the exhaust system is an important factor in engine performance. The length of an exhaust system is normally selected to correspond with the engine RPM at which maximum power is to be achieved. Variable length exhaust systems utilizing exhaust extension components which are controlled according to engine speed permit maximum engine efficiency at multiple engine RPMs, rather than at only one engine speed. Exhaust extension elements have also been utilized for tuning the acoustic performance of the exhaust system. "Whistle tips" and other components have been fashioned to connect to the end or within the exhaust pipe to produce varying auditory noises or pitches. Some tips are fixed or welded in place, while others utilize rotatable or slidable components. These systems do not address the problem solved by the present invention.

Prior art exhaust extension systems do not address the significant problem of toxic exhaust fumes from an internal combustion engine entering the passenger cabin of an automobile. Not only is the smell of exhaust fumes unpleasant, it poses severe health risks if inhaled. When exhaust gas is introduced into a closed area, such as the passenger cabin of a vehicle, the health risk to humans or animals becomes acute.

A well known toxic component of exhaust gas is carbon monoxide. When inhaled, carbon monoxide replaces oxygen in the lungs and causes serious injury or death to humans. Breathing even low levels of carbon monoxide leads to headaches or problems with vision and coordination. These physical impairments become dangerous while driving an automobile. Carbon monoxides, nitrogen oxides and hydrocarbons are also present in the exhaust fumes. These are known to cause eye, nose, throat and respiratory problems. Despite improvements in engine efficiency and compliance with stricter emissions standards focused on reducing such pollutants, exhaust gas from internal combustion engines continue to threaten the health of individuals.

When a vehicle sits at idle with its engine running, the surrounding environment and wind conditions play a significant role in dispersing the exhaust gas. When the vehicle is moving forward, a vacuum effect at the rear-end of the vehicle caused by the aerodynamics of the automobile pulls the exhaust gas underneath the vehicle. The exhaust gas circulates underneath the automobile where it can potentially enter the passenger cabin.

Current attempts at reducing the intake of exhaust fumes into the passenger compartment have been the use of plugs or seals to close manufacturing or other holes in the vehicle leading into the passenger compartment. Foam products encapsulating certain underbody components have been used to help limit the entrance of exhaust gas into the interior of the vehicle cabin. This effort has been directed solely at limiting the number of passageways that lead into the passenger compartment. Other attempts have been directed to arranging parts on the automobile in order to alter the airflow of the moving vehicle in a way that disperses the exhaust gas. The exhaust pipe on the automobile, for example, can be reconfigured to discharge the exhaust gas out the side of the vehicle rather than out the rear of the vehicle.

These attempted solutions, however, have significant drawbacks. Sealing of apertures adds increased cost in the form of engineering support, material expense and manufacturing time. Moreover, desired sealing of the undercarriage of a vehicle may be impossible due to manufacturing constraints. Rearranging vehicle body parts to change airflow patterns has the same drawbacks. Even more problematic, predictions of aerodynamics and interior or exterior pressures for a specific vehicle are difficult or impossible to obtain during the initial design and engineering stage of a vehicle. The assembly and testing of a full scale prototype is required in order to obtain such characteristics accurately.

The present application provides a solution for reducing the amount of exhaust fumes entering the passenger compartment of a motor vehicle without the above drawbacks.

SUMMARY OF THE INVENTION

An exhaust apparatus that lengthens the exit path for burnt exhaust gas from the vehicle when the vehicle is in forward motion, but remains safely retracted when the vehicle is stationary or moving at low speeds to avoid accidental contact. The present invention provides a pipe extender positioned near the end of a vehicle exhaust pipe that retracts or extends, depending upon whether the motor vehicle is moving or not.

When a vehicle travels in the forward direction, air streams travel both over and under the chassis before combining together at the rear of the vehicle. When these air streams combine, turbulent air currents circulate closely behind the vehicle and can flow exhaust gas exiting an exhaust pipe at that location back underneath the vehicle. By extending the exhaust path during forward movement, the exhaust gases generated by the moving vehicle are expelled at a greater distance, thereby avoiding the turbulence and vacuum effect immediately behind the vehicle, and are flowed away from the chassis resulting in a significant reduction in interior cabin exhaust levels. The vehicle's aerodynamics need not be changed during the design stage. Moreover, existing vehicle designs may be retrofitted to further reduce toxicity levels within the passenger compartment.

A pipe extender is located at the end of an exhaust pipe. The pipe extender is maintained in a retracted position when the vehicle is stationary or moving slowly in a forward direction by springs or an electromechanical arm. In the retracted position, the pipe extender is close to the vehicle and lessens accidental contact with persons, animals, or objects passing near the automobile. Once the vehicle is moving, the pipe extender moves beyond the end of the exhaust pipe, lengthening the path the exhaust gases must travel to exit the exhaust system. This pipe extender may extend and retract either via motorized or electromagnetic control receptive to a sensor indicating vehicle movement or via airflow resulting from vehicle movement and operating against a spring acting to retract the pipe extender.

BRIEF DESCRIPTION OF THE DRAWINGS

The exact nature of the invention, as well as its advantages will be readily appreciated upon consideration of the following specification related to the attached drawings in which like reference numerals designate like parts throughout the figures thereof and wherein.

DETAILED DESCRIPTION OF THE PREFERRED EMBODIMENT

Figure 1:
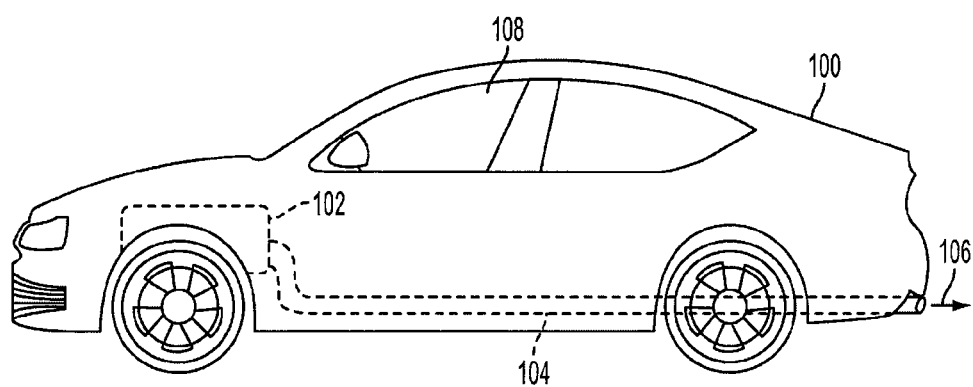
FIG. 1 is a side view of a vehicle with an exhaust system according to an embodiment of the present invention.

Referring now to FIG. 1, an automobile 100 contains an internal combustion engine 102 connected to an exhaust system 104. The automobile 100 can be any one of a variety of vehicles with an internal combustion engine, such as motor vehicles, motorcycles, trucks, boats, dune buggies, and scooters. After combustion of oxygen and fuel occurs within the engine 102, the burnt exhaust gases flow through the exhaust system 104. The exhaust gases exit the exhaust system according to arrow 106. When the automobile 100 is stationary or slowly moving forward, environmental conditions, such as wind, will substantially dissipate the exhaust gases after they exit from the exhaust system 104 before they can enter the passenger compartment 108 of the automobile 100. When the automobile 100 is moving at a sufficient speed in the forward direction, airflow created by the moving vehicle aerodynamics causes the exhaust gases to be sucked back towards and under the vehicle due to a vacuum effect at the rear of the automobile 100. The gases tend to circulate underneath the automobile 100. Because of this phenomenon, the exhaust gases tend to seep into the passenger compartment 108 of the automobile 100.

Figure 2:
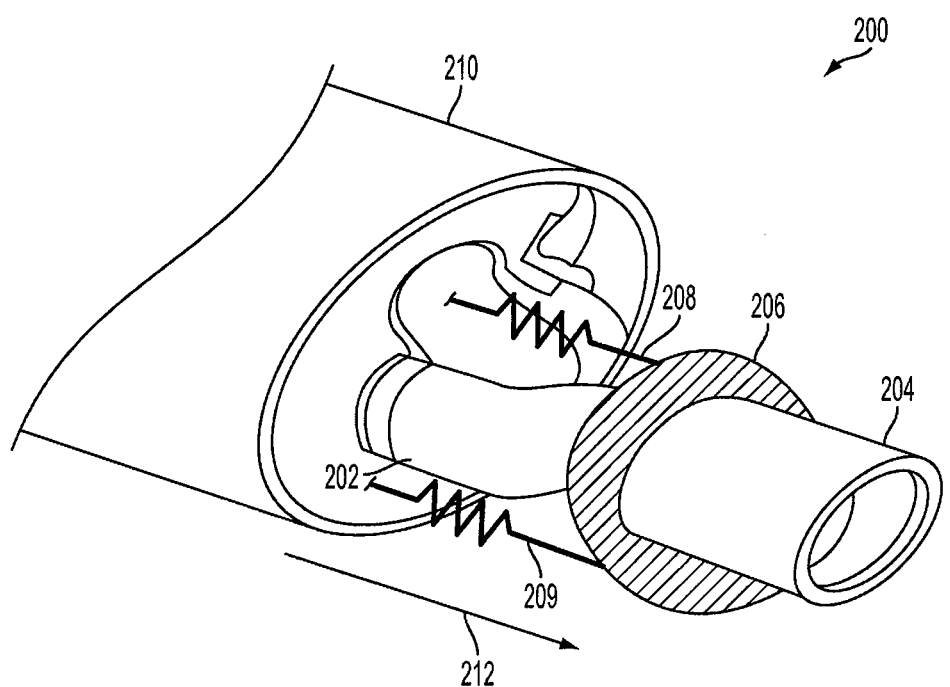
FIG. 2 is a perspective view of an exhaust system according to an embodiment of the present invention.

Referring now to FIG. 2, which shows an embodiment of an extendible exhaust system 200 in perspective view, the extendible exhaust system 200 shows an exhaust pipe 202 coming or extending from a muffler 210. A pipe extender 204 having a flange 206 mounted thereon is slidably attached to the exhaust pipe 202. Tension springs 208 and 209 are attached to the flange 206 and to the muffler 210. The exhaust pipe 202 carries burnt exhaust gases from the engine (not shown) of the automobile 100 (FIG. 1) for dispersal to the outside air near the automobile 100. The exhaust pipe 202 and the muffler 210 can be made of any number of materials capable of withstanding the heat of the burnt exhaust gas, including, but not limited to, steel, aluminum, titanium, carbon fiber or any similar material.

The pipe extender 204 either slidably encompasses the exhaust pipe 202 or fits within the exhaust pipe 202. The pipe extender 204 slides along the axis of the exhaust pipe 202, either extending beyond the end of the exhaust pipe 202 to increase the length of the extendible exhaust system 200, or retracting to a nested position. Like the exhaust pipe 202, the pipe extender 204 can be made of any number of materials capable of withstanding the heat of the burnt exhaust gas, including, but not limited to, steel, aluminum, titanium, carbon fiber or any similar material. Certain materials provide better aesthetics or lower weight at the expense of material cost or ease of manufacturing.

The flange 206 mounted to the pipe extender 204 provides a surface upon which airflow 212 exerts a force, sliding the pipe extender 204 along the exhaust pipe 202, as discussed in detail below. The flange 206 may be a separate plate fastened to the pipe extender 204, by welding or other attachment method, or the flange 206 and the pipe extender 204 may be manufactured as a single part. The flange 206 is preferably circular in shape as shown, but other shapes may also be used. Different shapes may exhibit varying degrees of effectiveness in capturing airflow or may fit better with the other automotive parts located in the vicinity of the flange 206.

The tension springs 208 and 209 are connected between the pipe extender 204 and a fixed location on the automobile 100. FIG. 2 shows the tension springs 208 and 209 connected to the muffler 210, which is preferred. The tension springs 208 and 209 may be directly connected to the pipe extender 204 or to any intermediary component attached to the pipe extender 204. Multiple springs are preferred. Only one spring may be sufficient. Compression springs may be utilized in alternative embodiments, for example the embodiment shown in FIG. 5 and FIG. 6, as discussed below. The pipe extender 204 may incorporate an acoustic component for altering the sound made when the exhaust gas flows through it, or change the exhaust note depending upon vehicle speed, and could be a metal bar, wedge, or other shape that is either mounted to or inserted within the pipe extender 204.

Figure 3:
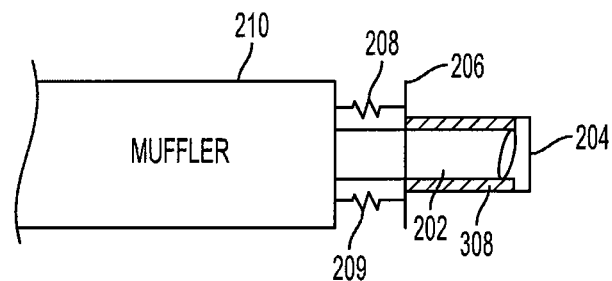
FIG. 3 is a side view of the exhaust system shown in FIG. 2 in a retracted configuration according to an embodiment of the present invention.

FIG. 3 shows a side view of the embodiment demonstrated in FIG. 2 in a retracted configuration. When the automobile 100 (FIG. 1) is stationary or moving slowly, the pipe extender 204 remains in the retracted position as shown. The pipe extender 204 with the flange 206 are pulled by the tension springs 208 and 209 along the exhaust pipe 202 towards the muffler 210. The tension springs 208 and 209 may be connected between the pipe extender 204 and any fixed location on the automobile 100, including the exhaust pipe 202 itself, so long as the pipe extender 204 is pulled by the tension springs 208 and 209 towards muffler 210. In this retracted position, the potentially hot pipe extender 204 does not protrude out from the automobile 100 where humans or animals may accidentally contact it when passing within the vicinity.

Figure 4:
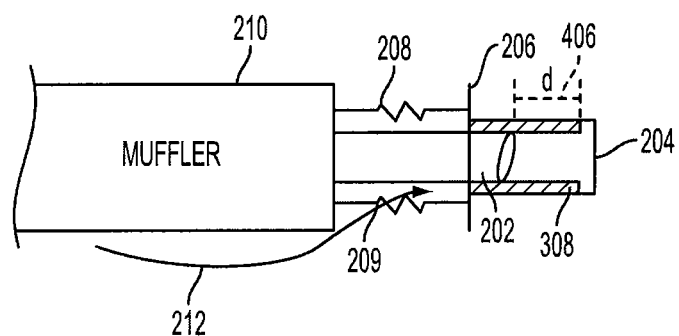
FIG. 4 is a side view of the exhaust system shown in FIG. 2 in an expanded configuration according to an embodiment of the present invention.

Referring now to FIG. 4 which shows a side view of the embodiment demonstrated in FIG. 2 but in an extended configuration, when the automobile 100 (FIG. 1) travels in a forward direction at a predetermined rate of speed, the pipe extender 204 moves to an extended position as shown. Airflow 212 resulting from the vehicle movement exerts a force on the flange 206 against the resisting force of the tension springs 208 and 209. When the force of the airflow 212 is greater than the force of the tension springs 208 and 209, the pipe extender 204 extends by sliding along the exhaust pipe 202. The tension springs 208 and 209 are selected to have a certain tension. The selected spring tension prevents the pipe extender 204 from sliding into the extended configuration due to the airflow 212 until the vehicle is traveling at a predetermined rate of speed. At least 10-20 miles per hour is a preferred rate of speed for the extension of the pipe extender 204 to avoid the vacuum effect flowing exhaust gas under the vehicle. One tension spring 208 may have a tension that is different from (e.g., less than or greater than) the tension of the other tension spring 209. For example, if the tension spring 208 has a tension that is less than a tension of the tension spring 209, the pipe extender 204 may tilt downward further allowing the exhaust gas leaving the pipe extender 204 to be directed in a downward direction.

Sliding the pipe extender 204 out along the exhaust pipe 202 lengthens the exhaust path that the exhaust gas must travel by a distance "d" 406. Distance "d" 406 is selected to be sufficient to reduce or prevent the exhaust gas from entering the passenger cabin of the vehicle. It has been determined that "d" equal to or greater than at least six inches will have such an effect and avoid the vacuum effect at the rear of the vehicle. Three to four inches may also be sufficient. The pipe extender 204 should have a fairly gas impervious slip fit with the exhaust pipe 202. Exhaust gas should not bypass the pipe extender 204 when in the extended configuration. Additional sealing may be used, such as a slip gasket 308 between the exhaust pipe 202 and the pipe extender 204. The slip gasket 308 may occupy an extended length along the pipe extender 204 as shown, or be shorter in length. A lengthier slip gasket 308 can provide better sealing, but at the expense of higher material costs.

Figure 5:
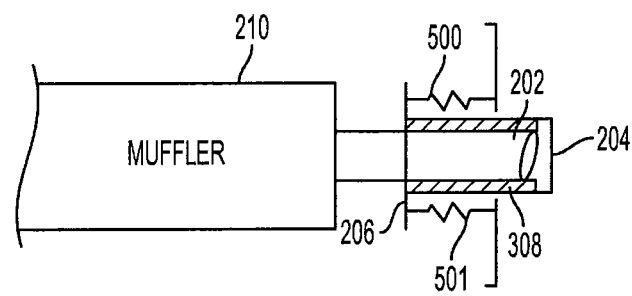
FIG. 5 is a side view of an exhaust system in a retracted configuration according to an another embodiment of the present invention.
Figure 6:
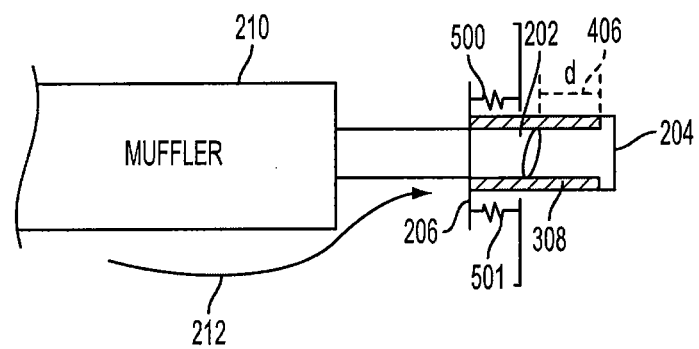
FIG. 6 is a side view of the exhaust system of FIG. 5 in an expanded configuration according to another embodiment of the present invention.

FIG. 5 shows a side view of an alternate embodiment of the present invention in a retracted configuration. FIG. 5 shows a pipe extender 204 in the retracted position over an exhaust pipe 202, similar to the embodiment shown in FIG. 3, but utilizes compression springs 500 and 501 in place of the tension springs 208 and 209 (FIG. 3). The compression springs 500 and 501 may be connected between the pipe extender 204 and any fixed location on the automobile 100 (FIG. 1) so long as the pipe extender 204 is forced by the compression springs 500 and 501 towards the retracted position. As shown in FIG. 6, when the airflow 212 resulting from vehicle movement in the forward direction exerts a force on the flange 206, the compression springs 500 and 501 compress and resist the force exerted by the airflow 212. When the force of the airflow 212 is greater than the force of the compression springs 500 and 501, the pipe extender 204 extends by sliding along the exhaust pipe 202.

Figure 7:
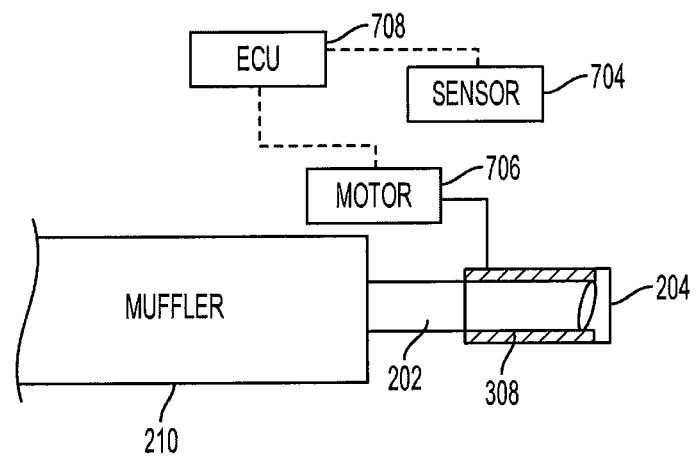
FIG. 7 is a side view of an exhaust system in a retracted configuration according to another embodiment of the present invention.
Figure 8:
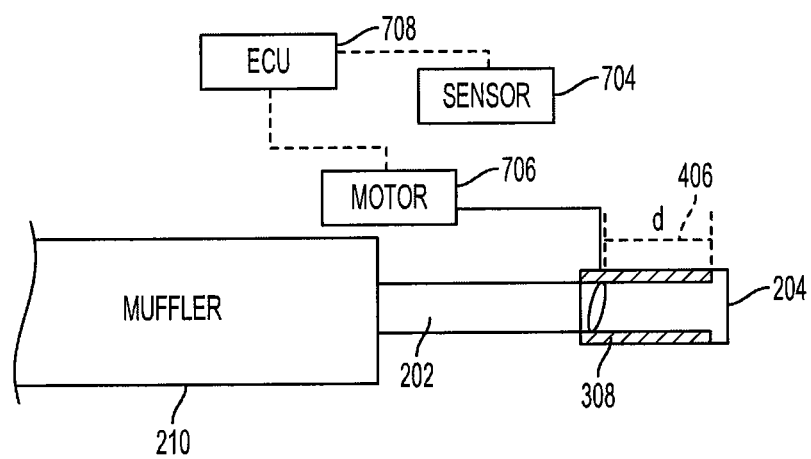
FIG. 8 is a side view of the exhaust system of FIG. 7 in an expanded configuration according to another embodiment of the present invention.

FIG. 7 shows a side view of a preferred embodiment of the present invention in a retracted configuration. When the automobile 100 (FIG. 1) is stationary or moving slowly, the pipe extender 204 remains in a retracted position. Once the automobile 100 has achieved a predetermined speed in the forward direction, the pipe extender 204 moves to its extended position, as shown in FIG. 8. The predetermined speed is selected to move the pipe extender 204 to its extended position in order to facilitate reduction of exhaust gas entering the passenger compartment, preferably at 10-20 miles per hour.

A sensor 704 located in or on the vehicle detects the movement and speed of the motor vehicle in the forward direction. A motor, electromagnetic solenoid, or other prime mover 706, responsive to the sensor 704, causes the pipe extender 204 to move along the exhaust pipe 202. When the sensor 704 detects that the automobile 100 is moving in the forward direction at the predetermined speed, the motor or prime mover 706 moves the pipe extender 204 from the retracted position shown in FIG. 7 to the extended position shown in FIG. 8. The sensor 704 may interface directly with the motor or prime mover 706, or may interface through an electronic control unit ("ECU") 708 of the automobile 100.

What has been described is an extendible exhaust system for preventing exhaust gas seepage into the passenger compartment of an automobile by positioning an extendible pipe extender at the end of an exhaust pipe. Obviously many modifications and variations of the present invention are possible in light of the above teachings. It is therefore to be understood that within the scope of the appended claims the invention may be practiced otherwise than as specifically described.

What is claimed is:

1. An apparatus for directing exhaust gas away from a moving vehicle, comprising:
    an exhaust pipe attached to a muffler;
    a pipe extender slidably mounted to the exhaust pipe between a first position and a second position, the pipe extender having a flange circumscribing an outer surface of the pipe extender, the flange configured to receive an airflow causing the pipe extender to move to the second position; and
    a spring connected to the pipe extender and configured to restore the pipe extender to the first position.

2. The apparatus of claim 1, wherein the spring is a tension spring.

3. The apparatus of claim 1, wherein the pipe extender is adapted to slide along the exhaust pipe at least six inches beyond the end of the exhaust pipe.

4. The apparatus of claim 1, wherein the spring allows movement of the pipe extender to the second position after the vehicle is moving at least 10 mph in a forward direction.

5. The apparatus of claim 1, further comprising a gasket between the pipe extender and the exhaust pipe.

6. An apparatus for directing exhaust gas away from a moving vehicle, comprising:
    an exhaust pipe having an outer rim and attached to a muffler;
    a pipe extender having a distal end and slidably mounted to the exhaust pipe between a first position and a second position, the distal end extending farther away from the outer rim when in the second position than when in the first position;
    an electromagnetic prime mover for sliding the pipe extender along the exhaust pipe; and
    a sensor for sensing movement of the vehicle and directing activation of the electromagnetic prime mover.

7. The apparatus of claim 6, wherein the pipe extender is adapted to slide along the exhaust pipe at least six inches beyond the outer rim of the exhaust pipe.

8. The apparatus of claim 6, further comprising a gasket between the pipe extender and the exhaust pipe.

9. The apparatus of claim 6, wherein the prime mover moves the pipe extender along the exhaust pipe to the second position when the vehicle is moving at least 10 miles per hour in a forward direction.

10. The apparatus of claim 6, wherein the sensor interfaces with an electronic control unit for directing activation of the prime mover.

11. An apparatus for directing exhaust gas away from a moving vehicle, comprising:
    an exhaust pipe having an outer rim;
    means for extending the exhaust pipe between a first position and a second position, a distal end of the means for extending the exhaust pipe located farther away from the outer rim when in the second position than when in the first position;
    means for moving the means for extending along the exhaust pipe; and
    means for sensing movement of the vehicle and directing activation of the means for moving.

12. The apparatus of claim 11, wherein the means for extending is adapted to slide along the exhaust pipe at least six inches beyond an end of the exhaust pipe.

13. The apparatus of claim 11, further comprising a gasket between the means for extending and the exhaust pipe.

14. The apparatus of claim 11, wherein the means for moving moves the means for extending along the exhaust pipe to the second position when the vehicle is moving at least 10 miles per hour in a forward direction.

15. The apparatus of claim 11, wherein the means for sensing interfaces with an electronic control unit for directing activation of the means for moving.

16. An apparatus for directing exhaust gas away from a moving vehicle, comprising:
   an exhaust pipe attached to a muffler;
   a pipe extender mounted to the exhaust pipe and configured to slide between a first position retracted over the pipe extender and a second position extended away from the muffler, the pipe extender including a flange configured to receive an airflow to move the pipe extender towards the second position; and
   an elastic component attached to the pipe extender and configured to be deformed when the flange receives the airflow thereby allowing the pipe extender to move from the first position to the second position.

17. The apparatus of claim 16, wherein the elastic component comprises a tension spring connected between the pipe extender and the muffler.

18. The apparatus of claim 16, wherein the elastic component comprises a compression spring connected between the pipe extender and a fixed location on the vehicle.

19. The apparatus of claim 16, wherein the elastic component comprises a plurality of springs.

20. The apparatus of claim 19, wherein a first spring of the plurality of springs has a first spring constant and a second spring of the plurality of springs has a second spring constant, the first spring constant less than the second spring constant such that when the elastic component is deformed, the pipe extender tilts away from the first spring.

* * * * *